United States Patent

[11] 3,630,788

[72] Inventor Roy Erving Hennen
        Mequon, Wis.
[21] Appl. No. 847,353
[22] Filed Aug. 4, 1969
[45] Patented Dec. 28, 1971
[73] Assignee Globe-Union Inc.
        Milwaukee, Wis.

[54] VENTING AND FILLING DEVICE FOR STORAGE BATTERIES
    6 Claims, 2 Drawing Figs.

[52] U.S. Cl. .................................................. 136/177,
                                                136/179, 136/180
[51] Int. Cl. ........................................................ H01m 1/06
[50] Field of Search .................................... 136/177–180,
                                                    170, 181; 220/44

[56]                References Cited
              UNITED STATES PATENTS
2,175,993  10/1939  Lighton ........................ 136/178
2,309,331   1/1943  Rupp ............................ 136/179
2,341,382   2/1944  Jensen .......................... 136/179
2,471,585   5/1949  Rittenhouse et al. ......... 136/179
2,480,861   9/1949  Jaworski et al. .............. 136/180
2,491,370  12/1949  Forster ......................... 136/179
2,716,147   8/1955  Laughlin ...................... 136/177

Primary Examiner—Anthony Skapars
Attorneys—John Phillip Ryan, Glenn A. Buse, Donald D. Denton and David T. Terry ABSTRACT: A venting and filling device for a storage battery which comprises a funnel tube extending vertically through an opening in the cover of the battery and being adapted to be moved from a lower position to an upper position; in its lower position the tube defining a venting space within the opening and extending below the level of electrolyte within the battery and in the upper position the tube closing off the venting space and extending to a level substantially equal to the proper operating level of electrolyte in the battery; and an explosion-proof venting means operatively associated with the funnel tube and the battery cover for safely venting explosive gases escaping from the battery through the venting space.

PATENTED DEC 28 1971 3,630,788

INVENTOR
ROY E. HENNEN

BY *Denton and Terry*
ATTORNEYS

VENTING FILLING DEVICE FOR STORAGE BATTERIES

BACKGROUND OF THE INVENTION

This invention relates to a device for venting and for filling storage batteries and more particularly to a device having a unitary construction that provides for explosion-proof venting, filling, and automatic leveling of the electrolyte in stationary batteries utilizing liquid electrolytes.

Many different venting devices are known which allow introduction of a liquid, e.g., acid electrolyte or water, into a battery cell while passages, openings or the like venting means for gases within the interior of the cell are closed so that the liquid being introduced will not exceed a predetermined level within the cell. After filling, these devices are usually adjusted so that the gaseous products formed during operation of the battery can escape through the venting means. For example, U.S. Pat. No. 2,175,993 shows a filling and venting device for use in a storage battery cell which has a filling tube which extends through the cover of the battery to the normal electrolyte level and a vent through the tube communicating with the space in the cell above the electrolyte. A ring-shaped valve is mounted on a resilient ring and is biased by the ring to a position which closes the vent. In this position, the device functions as an automatic leveling device. A vent plug provided in the filling tube can be adjusted to engage the ring-shaped valve so that the valve is moved against the biasing force provided by the resilient ring to a position which opens the vent. In this position, the device functions as a vent for the cell.

One of the disadvantages of this type of venting device is that it is constructed of several separate elements such as the vent plug or vent which can be misplaced or lost by an operator and of elements which can become worn and thereby cause improper operation of the device such as the resilient ring. Also, these devices do not provide for explosion-proof venting of the cell.

In addition to these known devices, other devices have been provided which serve as explosion-proof venting and filling plugs or closures for storage batteries. Such devices usually have an elongated tubular member which extends below the surface of the electrolyte within the battery and venting means including a porous element for allowing explosive gases generated within the battery cell to escape to the atmosphere by diffusing through the porous element in such a manner that the danger of explosion caused by igniting the gases is reduced. One such known device is described by U.S. Pat. No. 2,471,585. These known devices, however, do not provide any means for insuring that the liquid electrolyte introduced into the battery can be maintained at a predetermined level and thus prevent overfilling of the battery.

SUMMARY OF THE INVENTION

Advantageously, the device of this invention provides a unitary construction which avoids many of the problems attendant to the known venting devices and which functions as a combined explosionproof vent, filling funnel, and automatic electrolyte leveling means by simple manipulation thereof.

Thus, this invention contemplates a venting and filling device for use in combination with a storage battery having at least one cell containing liquid electrolyte and a cover with an opening for introducing electrolyte into the cell, which comprises a funnel tube extending vertically through the opening in the cover, the tube being adapted to be moved vertically from a lower position to an upper position, (in the lower position the tube defines a venting space within the opening and extends below the level of electrolyte within the cell, and in the upper position the tube closes off the venting space within the opening and extends to a level substantially equal to the proper operating level of electrolyte within the cell), and explosion-proof venting means operatively associated with the funnel tube and the cover for safely venting gases escaping through the venting space. With this construction, the device in the lower position provides for explosion-proof venting of explosive gases generated within the cell during operation of the battery, and in the upper position the device provides for automatic leveling of electrolyte introduced through the tube to the proper level in the cell.

One particularly effective embodiment of the device of this invention is characterized in that the funnel tube has an upper portion with a conventional funnel or cone shape and a lower portion in the form of an elongated tube and the explosion-proof venting means comprises a pair of concentric tubular structures of microporous material, which form a venting chamber around the upper portion of the funnel tube that is in communication with the venting space. These tubular structures fit together adjacent to the opening in the cover so that gases generated within the battery cell must diffuse through a double wall of microporous material before venting into the atmosphere.

It will be appreciated that the tubular structures of microporous materials may be made of porous stone, glass, ceramic, plastic, metallic screen or like material which will allow explosive gases to diffuse to the atmosphere and which preferably will tend to cool the diffusing gases so that they have less tendency to ignite. It will also be understood that the microporous material serves as a barrier screen that will prevent flame propagation into the battery in the event the gases should become ignited in the atmosphere. Advantageously, the microporous material also minimizes the loss of liquid electrolyte from the battery. Any liquid electrolyte which may be entrained in the venting gases is removed therefrom as these gases pass through the microporous material. The liquid electrolyte so removed will drain back into the battery, thereby further reducing the frequency for refilling with electrolyte.

The device of this invention preferably is further characterized by a unitary construction in which one of the tubular microporous structures is secured to the upper portion of the funnel tube and the other is connected to a ringlike closure member or means that seals off the opening in the cover of the battery. The outer periphery of the closure member may be secured by threads, or the like fastening means to the opening in the battery cover. The closure member has an opening or orifice formed by its inner periphery. This orifice is operatively associated with the lower portion of the funnel tube to form the venting space when the tube is in its lower or "venting" position.

Advantageously, the lower tube portion of the funnel tube initially tapers outwardly in a frustoconical configuration to provide a neck portion with a reduced outer diameter adjacent to the junction of the upper and lower portions of the funnel tube. This neck portion of the funnel tube is arranged to be positioned in the orifice of the closure member to provide a venting space in the form of an annular opening. Furthermore, the lower or tube portion of the funnel tube has a sealing means in the form of a thickened waist portion arranged below the neck portion on the exterior surface of its frustum which is adapted to snap into the orifice of the closure member and thereby seal or close off the venting space when the funnel is raised to its upper or "filling and leveling" position.

BRIEF DESCRIPTION OF THE DRAWING

Additional advantages of the device of this invention will become apparent upon reference to the following detailed description of a preferred embodiment and the accompanying drawing in which.

DESCRIPTION OF THE PREFERRED EMBODIMENT

Figure 1:
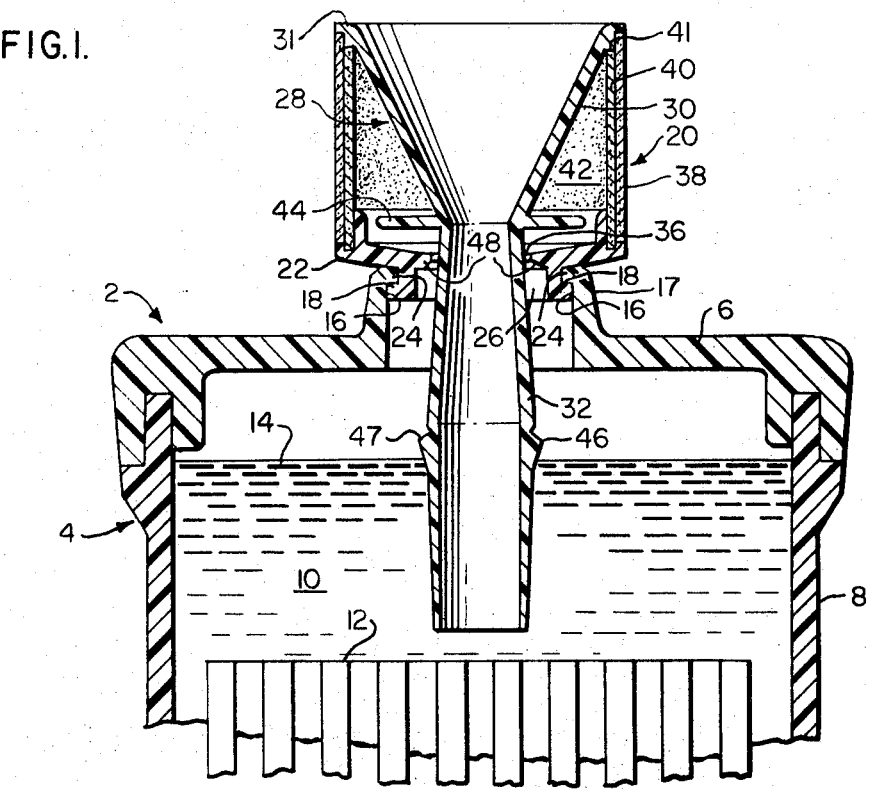
FIG. 1 is a side elevational view of a portion of a storage battery with the casing broken away to show the arrangement of the venting and filling device of the invention in its "venting" or lower position.

Reference numeral 2 in the drawing generally designates a stationary storage battery comprising a casing 4, having a cover 6, and four vertical sidewalls 8 (two of which are shown) bonded integrally with the cover to form a cell chamber 10. An electrode assembly is schematically shown in the cell chamber and is designated by reference numeral 12. The electrode assembly is of the conventional design used in acid-lead batteries and includes positive and negative plates alternately arranged with suitable separators and with connectors (not shown) of opposite polarity coupled to the respective positive and negative plate of the assembly. Terminal posts or connection means (not shown) are provided for the electrode assemblies for providing external and/or internal electrical connections for the circuit in which the battery is to be employed. The proper level of the sulfuric acid electrolyte within the cell chamber is indicated by reference numeral 14.

Opening 16 is provided in the cover 6 for introducing electrolyte into the cell chamber and, as shown in the drawing, the portion of the cover defining the opening 16 is provided with a recessed annular flange 17 and a bayonet-type fitting having lugs 18 with cam-shaped lower surfaces. The device of this invention, generally designated by reference numeral 20, is placed within the opening 16 of the battery cover. A ring-shaped closure member or means 22, having a cooperating bayonet fitting with notches 24, is secured to the periphery of the opening 16 by aligning the notches 24 with the lugs 18 and by pressing the closure member downwardly while turning it in a clockwise direction. It will be appreciated that the outer periphery of the closure member and the periphery of the opening may be provided with threads rather than the bayonet-type fittings shown. Also, the closure member may be integrally bonded with the battery cover.

The inner periphery of the closure member is provided with an orifice 26. Positioned within the orifice is a vertical funnel tube 28 which has an upper portion 30 with a funnel or cone shape and a lower portion 32 in a form of an elongated biconical tube. The upper portion of the funnel tube is provided with a circular flange 31. That part of the lower portion which is adjacent to the funnel-shaped upper portion tapers outwardly to provide a neck portion 34. In the "venting" or lower position of the funnel tube (shown in FIG. 1) the neck portion is arranged within the orifice 26 to define a venting space 36 in the form of an annular opening.

The circular flange 31 of the funnel tube is secured by cement or other appropriate bonding means to a tubular structure 38 made of microporous ceramic material. In the "-venting" position, tubular structure 38 rests on the outer extremity or edge of the closure member.

Figure 2:
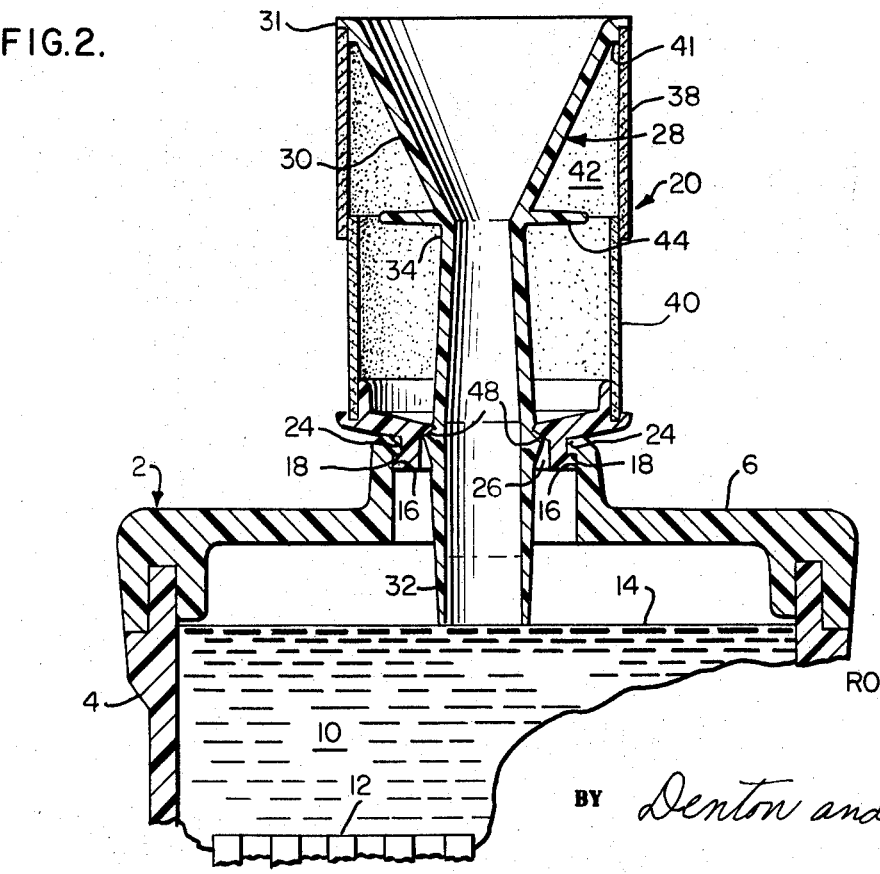
FIG. 2 is a side elevation view of the storage battery illustrated in FIG. 1 showing the arrangement of the venting and filling device in its upper or "filling and leveling" position.

Another tubular structure 40 of microporous ceramic material is secured by cement or other appropriate means to the closure member. As shown in FIGS. 1 and 2, this structure is arranged concentrically and in sliding contact with the tubular structure 38. The upper edge of tubular structure 40 engages the funnel tube on a horizontal ledge 41 provided on the circular flange. In this manner the tubular structures 38 and 40 fit together in a telescoped concentric arrangement to provide a double wall of microporous material and to provide support means for the funnel tube in the position shown in FIG. 1.

In the position shown in FIG. 1, the bottom of the funnel tube is well beneath the surface of the electrolyte in the cell so that gases generated therein are sealed from the interior of the funnel tube. Consequently, these gases can escape only through the venting space. In this position, only the small surface area inside the funnel tube is exposed to the atmosphere. Gases generated within this small area will not accumulate to a concentration sufficient to provide any hazard of explosion.

A venting chamber 42 is defined by the closure member, the exterior of the funnel-shaped portion 30 and the doubled wall of microporous material. Chamber 42, which is in communication with the venting space surrounding the neck portion of the funnel tube, collects explosive gases, such as hydrogen, generated within the battery during the charging and discharging operations and allows the gases to expand thereby reducing their escape velocity. The double wall of microporous material prevents the gases from venting directly into the atmosphere.

It will be appreciated that the gases collected within the venting chamber will slowly diffuse through the microporous material to the atmosphere. If the diffused gases are accidentally ignited by a flame or spark outside of the double wall of microporous material, the cooling or heat dissipating effect of the microporous material will cause the resulting flame to extinguish quickly and will stop any flame propagation into the battery via the venting chamber and venting space.

Thus, it will be understood that in the position shown in FIG. 1 the device serves in its explosion-proof venting capacity. The gases generated in the battery must vent through the annular opening surrounding the funnel tube into the venting chamber. The collected gases then diffuse through the microporous material to the atmosphere.

A baffle 44 is also provided above the annular opening on the exterior of the funnel tube at the junction between its upper and lower portions. This baffle interrupts the flow of gases from the venting space to the microporous surfaces thereby causing any entrained electrolyte to condense upon it (before reaching the microporous surfaces) and to return to the cell down along the exterior of the funnel tube. Advantageously, the baffle 44 also acts as a splash guard to prevent the direct impingement of the liquid electrolyte onto the microporous material, thereby preventing the material from becoming clogged by liquid saturation.

The lower portion of the funnel tube is provided with a sealing means 46 in the form of a thickened waist portion with an annular groove 47. The closure member is also provided with a sealing rim 48 which defines the orifice 26.

As shown in FIG. 2, to employ the device as a filling funnel and leveling means it is necessary to raise the top portion of the funnel tube to an upper position. The operator only needs to pull the funnel up by the top until the groove on the thickened waist portion snaps into the annular opening against the sealing rim thereby providing support for the funnel tube and also closing off the opening. At this time the bottom of the funnel tube is raised to a level predetermined as a proper electrolyte level (minus the volume of the funnel). In this filling and leveling position, water or additional electrolyte is added to the cell through the funnel tube until the level inside reaches the bottom of the funnel. At this point an air lock forms inside the cell thereby preventing the level of electrolyte from rising further except in the funnel itself. It will be appreciated that the funnel tube can be filled to a predetermined level which may be indicated by appropriate indicia such as a colored ring or other appropriate markings.

After the cell is filled with electrolyte, the top portion of the funnel tube is then pushed downwardly into the lower position, thereby breaking the seal formed between the thickened waist portion and the sealing rim of the closure member. Consequently, the air lock is also broken. Any liquid in the funnel tube then drops to the same level as that of the rest of the cell and the device again serves in its explosion-proof capacity.

It will be understood that the funnel tube and closure member of the device of this invention are formed from acid resistant, resilient, materials such as synthetic rubber, polyethylene, polypropylene, vinyl resins and the like.

What is claimed is:

1. In a venting and filling device for use in combination with a storage battery having at least one cell containing liquid electrolyte and a cover including orifice means for introducing electrolyte into said cell, the improvement comprising a funnel tube, having an asymetric dependent tube portion of which at least the upper portion of said tube is of frustoconical configuration having a frustum larger than said orifice means located below said orifice means, extending vertically through said orifice means and being adapted to be moved vertically from a lower position to an upper position relative to said battery, said tube in its lower position defining an annular venting passage between said tube and said orifice means and extending below the level of the electrolyte in said cell, and said tube in its upper position sealing off said venting passage by engagement of said frustum with said orifice means and extending to the level substantially equal to the proper operating level of said electrolyte; and selectively operated explosion-proof venting means joined to the funnel portion of said funnel tube and positionally activated in response to the motion of said funnel tube connected with said cell through said venting passage when said funnel tube is in the lower position and disconnected from said cell when said funnel tube is in the upper position.

2. The device of claim 1 in which said explosion-proof venting means comprises a venting chamber having a wall of microporous material which surrounds the upper portion of the funnel tube and which is in communication with said venting space whereby gases escaping through said venting space collect in said chamber and then diffuse through said wall of microporous material to the atmosphere.

3. The device of claim 1 in which said tube portion is of biconical configuration.

4. The device of claim 2 in which said wall of microporous material comprises at least two fitted concentric tubular structures joined in telescoping relationship responsive to the movement of said funnel tube.

5. The device of claim 4 in which said wall of microporous material comprises an outer tubular structure of microporous material, an inner tubular structure of microporous material fitted within said outer structure in sliding relationship therewith, said outer structure being joined to the upper portion of said funnel tube and movable therewith and said lower portion being fixed to said cover.

6. The device of claim 1 further comprising a sealing device in which the frustoconical portion of said funnel tube has engaging means on its exterior for sealing off said orifice means when said tube is in its upper position.

* * * * *